United States Patent [19]
O'Neill et al.

[11] Patent Number: 5,935,441
[45] Date of Patent: *Aug. 10, 1999

[54] WATER PURIFICATION PROCESS

[75] Inventors: Gary A. O'Neill, Tyngsboro; Kitty K. Siu, Dracut; Jeffrey P. Denoncourt, Winchester, all of Mass.

[73] Assignee: Millipore Corporation, Bedford, Mass.

[*] Notice: This patent issued on a continued prosecution application filed under 37 CFR 1.53(d), and is subject to the twenty year patent term provisions of 35 U.S.C. 154(a)(2).

[21] Appl. No.: 08/708,625

[22] Filed: Sep. 5, 1996

[51] Int. Cl.⁶ .................................................. C02F 9/00
[52] U.S. Cl. .................. 210/638; 210/664; 210/668; 210/669; 210/677; 210/900
[58] Field of Search .................... 210/638, 650, 210/668, 669, 677, 685, 694, 748, 900 686, 664

[56] References Cited

U.S. PATENT DOCUMENTS

| | | | |
|---|---|---|---|
| 3,870,033 | 3/1975 | Faylor | 210/900 |
| 4,430,226 | 2/1984 | Hegde et al. | 210/900 |
| 4,990,260 | 2/1991 | Pisani | 210/900 |

FOREIGN PATENT DOCUMENTS

| | | |
|---|---|---|
| 0 585 036 A1 | 3/1994 | European Pat. Off. |
| 60-261585 | 12/1985 | Japan |
| 63-264199 | 11/1988 | Japan |
| 06126271 | 5/1994 | Japan |
| 07060291 | 3/1995 | Japan |

OTHER PUBLICATIONS

International Search Report for International Application No. PCT/US97/13049; date of Mailing Nov. 24, 1997 (7 pages).

International Preliminary Examination Report for International Application No. PCT/US97/13049; date of Mailing Dec. 3, 1998 (6 pages).

"Reinstwasser von A biz Z, " H. Bendlin, VCH, Weinhweim (1995), Germany, pp. 41–42.

*Primary Examiner*—Ivars Cintins
*Attorney, Agent, or Firm*—John Dana Hubbard; Timothy J. King; Paul J. Cook

[57] ABSTRACT

Ultrapure water containing less than 10 ppt total ions, other than hydrogen ion and hydroxide ion is produced by passing deionized water through a system comprising an ultrafiltration step, an oxidizing step where water is exposed to ultraviolet light and ion exchange step. The treated water is recirculated through the oxidizing step and the ion exchange step. Product water from the system can be recovered on a continuous basis so long as the ratio of volume of water circulated within the system to volume of water drawn from the system is at least 10 and preferably at least 20.

12 Claims, 5 Drawing Sheets

WATER PURIFICATION PROCESS

BACKGROUND OF THE INVENTION

This invention relates to a system for producing ultrapure water and to the ultrapure water product so-produced. More particularly, this invention relates a water purification system capable of removing organic and ionics species from water to produce ultrapure water.

At the present time, analytical instruments, including high performance liquid chromatography (HPLC) ion chromatography (IC) and inductively coupled plasma mass spectroscopy (ICP MS) detect the type and the concentration of anions and cations in liquid samples. A convenient method for measuring the concentration of various specific ions is to compare the unknown sample which has been subjected to analysis to a blank standard liquid and standards of known ion concentration. The unknown sample contains various specific ions of unknown concentrations. The blank standard is known to have a very low ion concentration. The ion standards are the same blank standard with known concentrations of specific ions added. The comparison of the unknown sample, blank standard and ion standards can be used, for example in a chromatographic separation process to determine ion concentrations in the unknown sample.

A limitation in this comparison procedure is imposed by the ion concentration in the blank standard. The blank standard also must be free of gas bubbles to prevent interference with ion concentration measurement. The lower limit of ion concentration which can be measured in the sample is limited by the ion concentration in the blank standard. Thus, the user of the chromatographic process cannot determine the concentration of ions in the sample which is lower than the concentration of ions in the blank standard. At the present time, the pure water utilized as a blank standard contains about fifty parts per trillion (ppt) of total anions and cations. In addition to the purity of the water being limited to about 50 ppt, the storage of water in a container either before use or within the system provides a site for bacteria growth which contaminates the water.

At the present time, a method for producing ultrapure water for use as a blank standard comprises passing a source of deionized water through a series of beds, usually between four and six beds, containing a mixture of cation exchange resin beads and anion exchange resins beads which, optionally, can include particulate activated carbon. The purified water obtained from the series of deionizing beds is then directed to a water storage step such as a 20–50 liter Nalgene (high density polyethylene) bottle which introduces only a very low level of contaminating ions into the water. In a preferred procedure, the atmosphere in the storage bottle comprises an inert gas such as helium. After the desired amount of water has been introduced into this purification system, the system is closed to additional deionized water feed. The water within the system then is recirculated from the storage area through the series of beds and back to the storage area, usually for about 6 to 24 hours. In this manner, ions are continuously removed from the water to produce ultrapure water having an ion concentration as low as about 50 parts per trillion. This ultrapure water then can be used as a source of blank standards in chromatography systems.

Accordingly, it would be desirable to provide a system for producing ultrapure water having an ion concentration less than about 50 ppt and preferably less than 10 ppt. Furthermore, it would be desirable to provide such a system which eliminates the need for storing of purified water thereby eliminating a potential source of bacteria growth. Furthermore, it would desirable to provide such a system which eliminates gas bubbles in the water that may interfere with instrument measurement of ion concentration.

SUMMARY OF THE INVENTION

The present invention provides a process for producing ultrapure water having a total ion concentration, other than hydrogen ion and hydroxide ion, between 1 and 10 ppt. The process of this invention utilizes a purified feed water such as deionized water feed having a resistivity of less than about 1 to about 18 megohm which can be obtained by any conventional means for producing purified water, such as by ion-exchange, distillation, or reverse osmosis product water. The feed water is passed sequentially through an ultrafiltration step, an oxidizing step which exposes the water to ultraviolet light and then through an ion exchange step. The treated water then is recirculated sequentially through the oxidizing step and the ion exchange step continuously to effectively remove ions so that the water thus produced contains between 3 and 10 ppt total ions other than hydrogen ion and hydroxide ion. While the majority of the treated water is continuously recirculated, a small fraction of the total treated water can be removed, either continuously or by discrete volumes, for use. As the product water is removed from the system, it is replaced by feed water entering the recirculation process. Optionally, the system can include a heat exchanger to remove heat introduced into the water from a pumping means used to recirculate the water and the ultraviolet light to which it is exposed. When it is desired to remove the ultrapure water from the purification process, it is filtered to remove any particulate present in the water and to remove any gas bubbles present in the water.

DESCRIPTION OF SPECIFIC EMBODIMENTS

Figure 1:
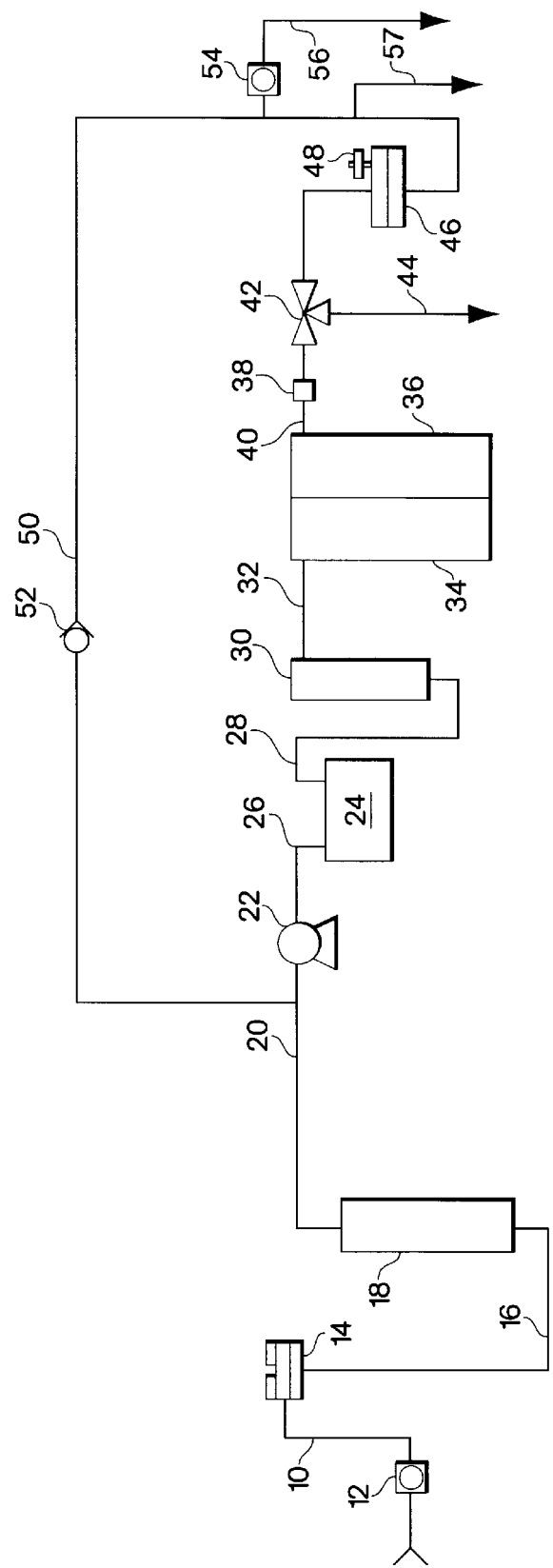
FIG. 1 is a schematic illustration of the process of this invention.

The ultrapure water of this invention is essentially free of organic contaminants and contains from 1 to 10 parts per trillion, preferably from 1 to 5 parts per trillion total ions, other than hydrogen ions and hydroxide ions. Thus, the ultrapure water of this invention is sufficiently pure to test samples containing less than 10 parts per trillion of ions other than hydrogen ions and hydroxide ions in conventional chromatography or other analytical processes such a conducted by the DX-100 Ion Chromatography System available from Dionex Corporation, Sunnyville, Calif. The ultrapure water of this invention can be introduced directly from the water purification system, as a blank standard, into in a chromatography process.

The process of this invention includes steps for directly removing colloids and organic solute contaminants having a molecular weight at least about 20,000, preferably at least about 5,000. The process of this invention also includes a step for oxidizing molecular organic species in solution to form ionic organic species. The process of this invention also includes a step of removing ionized inorganic species and ionized organic species by an ion exchange step utilizing a mixture of anion exchange resin particles and cation exchange particles. The mixture of anion exchange resin particles and cation exchange resin particles also can contain activated carbon particles.

The ultrafiltration step is conducted with a ultrafiltration filter having a nominal molecular weight cut off (NMWL) of at least about 20,000 and preferably at least about 5,000 NMWL. Particularly suitable ultrafiltration membranes are hollow fiber membranes such as those formed from polysulfone, or the like. Purified feed water is introduced into the ultrafiltration step and is filtered therein to remove organic and inorganic contaminants including colloids and solutes having a molecular weight greater than about 20,000, preferably having a molecular weight greater than about 5,000. This step serves not only to remove undesired organic contaminants but to reduce the organic load to the downstream ultraviolet light oxidizing step and the downstream ion exchange step. The effluent from the ultrafiltration step then is directed to the ultraviolet light oxidizing step. In the ultraviolet light oxidizing step, the water from the ultrafiltration step is exposed to ultraviolet radiation having a wave length between about 100 nm and about 300 nm, preferably between about 180 nm and about 190nm for a sufficient time to oxidize a significant portion of the total organic carbon (TOC) content in the water. Typically the water in this step is exposed to ultraviolet light for a time period about 2 and about 120 seconds. The oxidized TOC comprise ionic species which can be removed from the water in a downstream ion exchange step.

The downstream ion exchange step comprises at least one bed of a mixture of anion exchange particles and cation exchange particles. The anion exchange resin particles are capable of exchanging hydroxide ions with anions in solution. The cation exchange resin particles are capable of exchanging hydrogen ions with cations in solution. The extent to which undesirable anions and cations in solution are replaced with hydrogen ions and hydroxide ions is limited only by the ion exchange capacity of the particles as controlled by their volume within the mixed bed of ion exchange particles, the extent to which they have been exchanged prior to contact with the water and by the equilibrium ion exchange constant of the resin for specific ions. The mixture of anion exchange resin and cation exchange resin particles also can include particles of activated carbon which adsorb any nonionic species which may be present in the water. It is preferred that at least one bed of the ion exchange resin particles also contains activated carbon particles. Typically, this step can include between about one and about six beds of mixed ion exchange resin particles each of which typically have a volume between about 0.2 and about 6 liters. The process in conducted until breakthrough of undesirable anions and/or cations occurs in the effluent from the ion exchange step. Thus, this effluent should be monitored to determine the concentration of undesired anion and/or cation prior to being introduced as a blank standard into a downstream analysis step.

It is well known that the removal of cations from water by ion exchanges occurs more readily than the removal of anions from water by conventional ion exchange. Thus, the extent to which water purified in accordance with the process of this invention is more accurately determined by monitoring the concentration of anions rather than cations in the effluent from the process. The anions which provide a convenient measure of ion concentration in the effluent include the fluoride ion, chloride ion, nitrate ion, phosphate ion and sulfate ion. The measurement of the total cumulative concentration of these five ions provides an accurate assessment of the total ion concentration, excluding hydrogen ions and hydroxide ions, in the water effluent from the process of this invention. As stated above, the process of this invention is capable of producing ultrapure water having a concentration of undesired ions, excluding hydrogen ions and hydroxide ions, from 1 to 10 parts per trillion.

Referring to FIG. 1 deionized distilled, or reverse osmosis product feed having a resistivity of less than about 1 and up to about 18 megohm-cm is introduced through conduit 10 when inlet valve 12 is open. An optional port 14 can be provided as a means for conveniently cleaning the system. The feed water is directed through conduit 16 to ultrafiltration step 18 wherein the deionized water is passed through an ultrafiltration membrane capable of retaining colloidal particles and high molecular weight organic solutes. A first effluent from the ultrafiltration step 18 is pumped through conduit 20 by means of pump 22. An optional heat exchange step 24 can be positioned between conduit 26 and conduit 28 for the purpose of removing heat in the water which is introduced by the energy of the pump 22 and by exposing the water to ultraviolet light in oxidizing step 30. The effluent from the heat exchange step 24 is passed through conduit 28 and is introduced into oxidizing step 30 wherein it is exposed to ultraviolet light having a wavelength between about 100 and about 300 nm. The ultraviolet light catalyzes the conversion of organic contaminants to ionic species.

The effluent from oxidizing step 30 is passed through conduit 32 and through two beds of a mixture of anion exchange resin particles and cation exchange resin particles 34 and 36. It is preferred that at least one of the beds 34 or 36 also includes particles of activated carbon. Additional beds of ion exchange resin particles can be provided as desired. The deionized effluent from bed 36 is directed through conduit 40 to resistivity sensor 38 which provides a means for making a non-specific determination of the ion concentration in the effluent. The deionized effluent is passed through three-way valve 42 where the effluent can be directed to drain 44 or to filtration step 46. In filtration step 46, any particles introduced into the water being treated are removed and any gas bubbles in the treated water are removed through vent 48. A useful membrane for effecting these treatments is formed at polyvinlylidene difluoride. The treated water then is recirculated through the oxidizing step 30 and the ion exchange resin beds 34 and 36 through recirculation loop 50 when valve 52 is opened and pump 22 is activated to reduce the ion concentration in the water other than the hydrogen ion and hydroxide ion, to between 1 and 10 parts per trillion. When it is desired to utilize the treated water as a blank standard in an analytical analysis process, valve 54 is opened and the ultrapure water is directed to the analytical process (not shown) through conduit 56 for manual dispensing. Alternatively, the water, as a blank standard can be directed to the analytical process continuously through conduit 57. The ratio of water recirculated through recirculation loop 50 to water flow out of the system through conduit 56 and/or 57 is greater than 10, preferably greater than 20. Fresh incoming water feed is supplied to the purification system to maintain this water ratio by compensating for product water removal.

Figure 2:
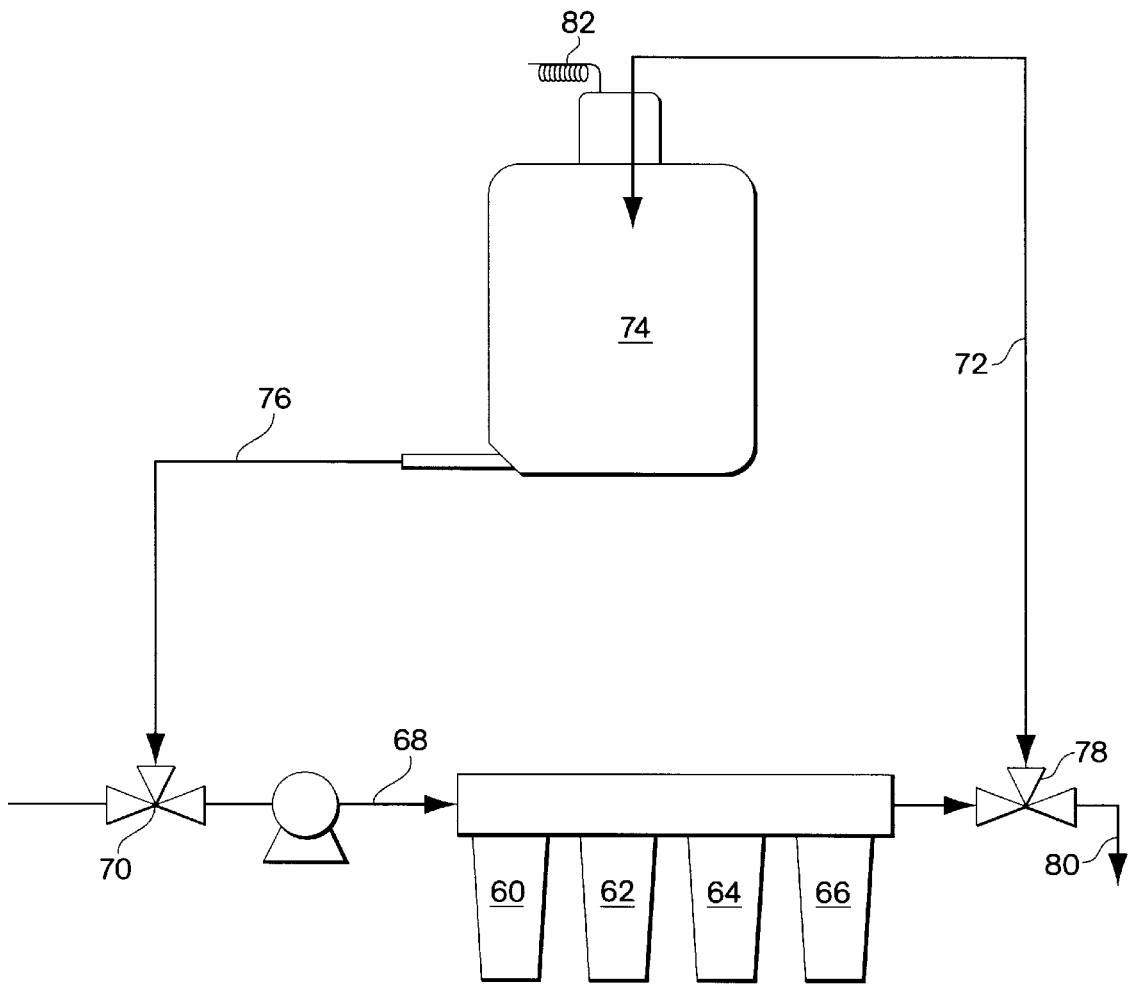
FIG. 2 is a schematic illustration of a process of the prior art.

Referring to FIG. 2, a process of the prior art for producing ultrapure water having a highest level of purity of about 50 parts per trillion is illustrated. Deionized water having a resistivity greater than about 1 megohm-cm is passed through four mixed beds of anion exchange resin and cation exchange resin 60, 62, 64 and 66 through conduit 68 when valve 70 is opened. At least of one of the beds 60, 62, 64 or 66 also contains activated carbon particles. The effluent water than is passed through recirculation loop 72 through storage container 74 which is formed from a noncontaminating polymeric composition such as high density polyethylene. (Nalgene) and then through conduit 76. The water is recirculated through beds 60, 62, 64 and 66 and container 74 for a time, usually between about 6 and about 24 hours, until the water has a purity level of about 50 ppt ion concentration other than hydrogen ion and hydroxide ion. Thereafter, the water is stored in container 74 until ready for use as a blank standard in the analytical process. When it is desired to use the pure water as a blank standard, valve 78 is opened and the ultrapure water is directed to an analytical process (not shown) through conduit 80. An inert gas, such as helium, is introduced through conduit 82 into container 74 in order to prevent introduction of contaminants from the surrounding atmosphere. A typical pressure for the inert gas within the container 74 is about 3 psig.

The following examples illustrate the present invention and are not intended to limit same.

EXAMPLE 1

Figure 3:
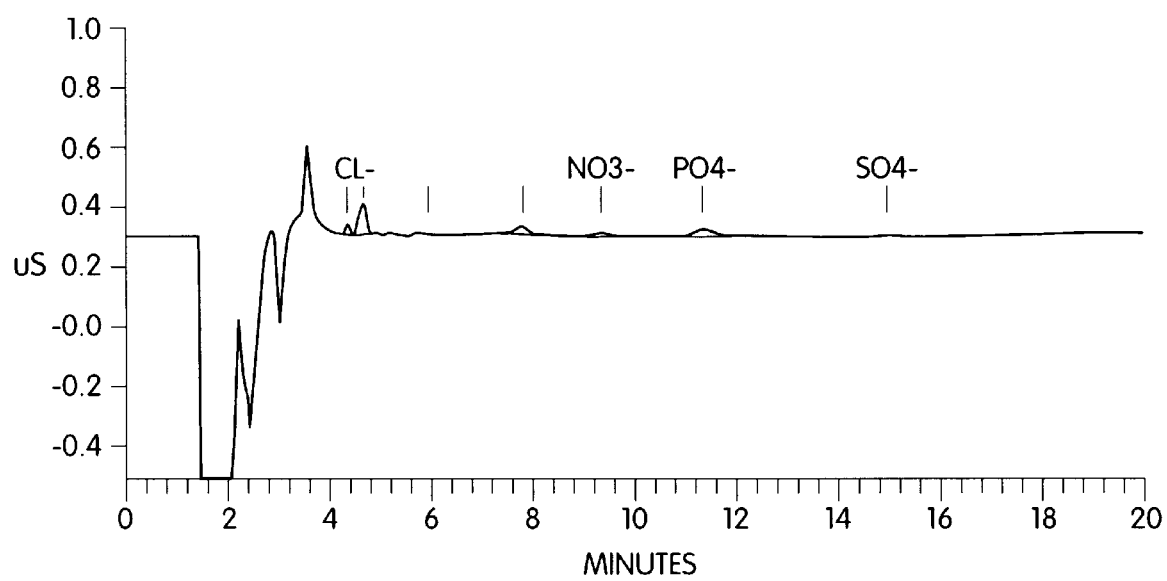
FIG. 3 is a graph showing the ion content of an ultrapure water of Example 1.

Referring to FIG. 3, a graph of conductivity in microsiemens as a function of retention time within a chromatography column of a DX-100 ion chromatomograph available from Dionex Corporation is shown. The sample being tested comprised water produced by the process illustrated in FIG. 1. The bed 34 comprised a mixture of 60 to 90% cation and anion exchange resin beads and 10 to 40% (volume) of activated carbon particles. The cation and anion exchange resin bed comprised a mixture of 30 to 45% cation exchange resin beads and 55 to 70% of anion exchange resin beads. The bed 36 comprised a mixture of 55 to 70% anion exchange resin beads and 30 to 45% cation exchange resin beads. The time that the water was exposed to ultraviolet light in oxidizing step 30, per pass, was 2 to 120 seconds. The ultrafiltration membrane in ultrafiltration step 18 was polysulfone hollow fibers available from Kuraray Corporation and the volume of hollow fibers utilized was about 4 sq. ft. The membrane in separation step 46 was polyvinylidene difluoride (PVFD) microporous membrane available from Millipore Corporation.

The results are shown in Table 1

TABLE I

| Pk. Num | Ret % Time | Component Name | Concentration PPT | Height | Area |
| --- | --- | --- | --- | --- | --- |
| 1. | 4.29 | Cl | 0.063 | 8761 | 76199 |
| 2. | 4.56 | | 0.000 | 31432 | 342132 |
| 3. | 5.89 | | 0.000 | 2252 | 66774 |
| 4. | 7.79 | | 0.000 | 9703 | 1705510 |
| 5. | 9.36 | $NO_3^-$ | 1.933 | 3674 | 97469 |
| 6. | 11.39 | $PO_4^-$ | 2.736 | 6901 | 166531 |
| 7. | 15.12 | $SO_4^-$ | 0.935 | 2866 | 117460 |
| | | Totals | 5.668 | 65590 | 1037076 |

EXAMPLE 2

Figure 4:
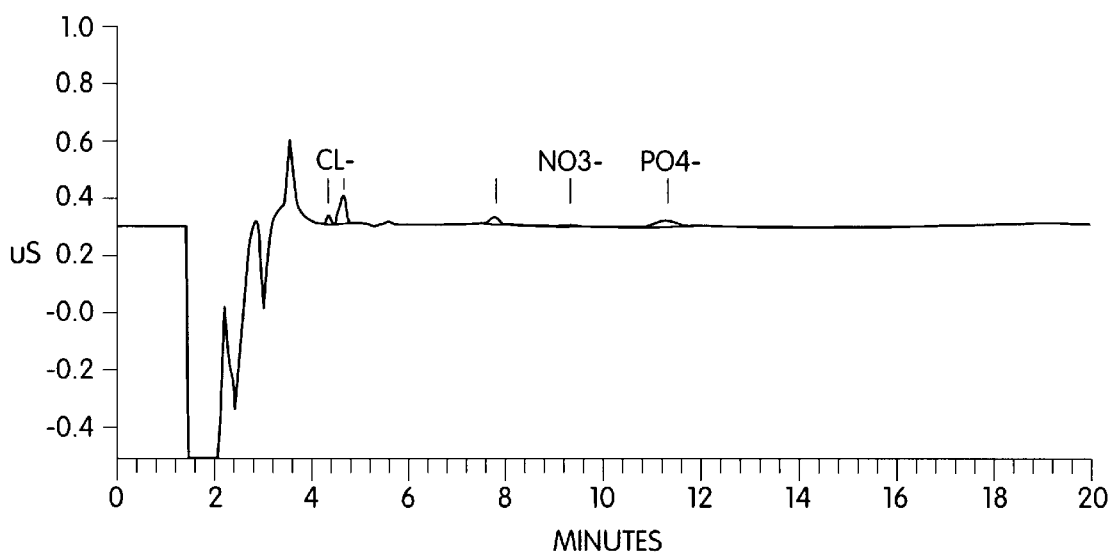
FIG. 4 is a second graph showing the ion content of the ultrapure water of Example 2.

The process of Example 1 was repeated with the results shown in Table 2 and FIG. 4.

TABLE 2

| Pk. Num | Ret % Time | Component Name | Concentration PPT | Height | Area |
| --- | --- | --- | --- | --- | --- |
| 1. | 4.27 | Cl | 0.063 | 8730 | 74934 |
| 2. | 4.53 | | 0.000 | 34054 | 363441 |
| 3. | 7.73 | | 0.000 | 8379 | 135914 |
| 4. | 9.36 | $NO_3^-$ | 1.573 | 2989 | 112855 |
| 5. | 11.28 | $PO_4^-$ | 2.909 | 7336 | 303434 |
| | | Totals | 4.544 | 61488 | 991578 |

EXAMPLE 3

Figure 5:
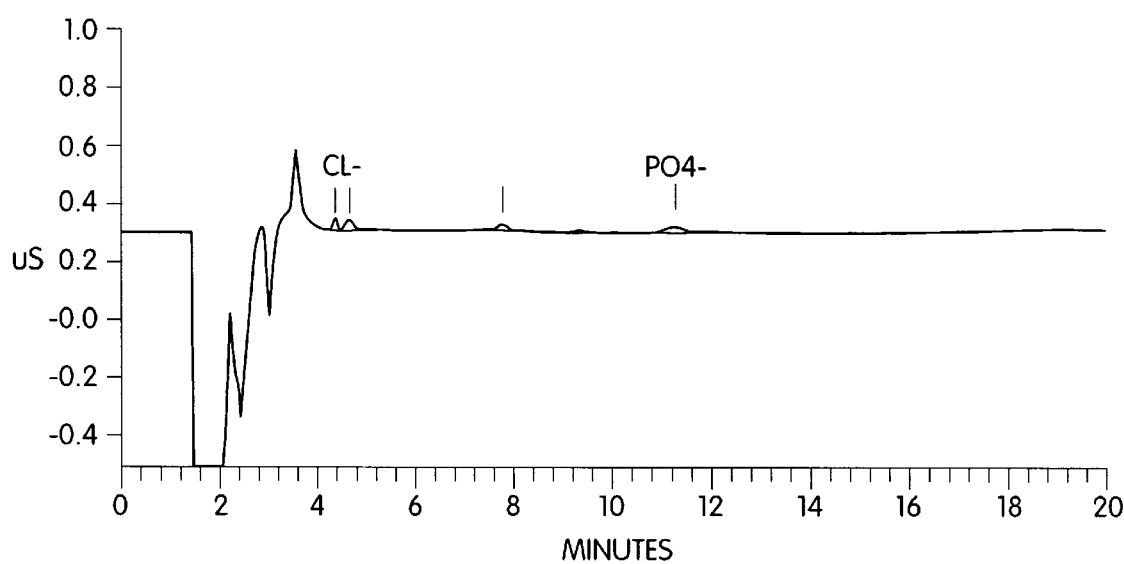
FIG. 5 is a third graph showing the ion content of the ultrapure water of Example 3.

The process of Example 1 was repeated with the results shown in Table 3 and FIG. 5.

TABLE 3

| Pk. Num | Ret % Time | Component Name | Concentration PPT | Height | Area |
| --- | --- | --- | --- | --- | --- |
| 1. | 4.29 | Cl | 0.090 | 11084 | 108799 |
| 2. | 4.59 | | 0.000 | 9384 | 101510 |
| 3. | 7.76 | | 0.000 | 5400 | 91731 |
| 4. | 11.39 | $PO_4^-$ | 2.321 | 5855 | 122570 |
| | | Totals | 2,412 | 31687 | 424610 |

What is claimed is:

1. The process for producing ultrapure water containing a total ionic concentration of less than about 10 parts per trillion of ions, other than hydrogen ion and hydroxide ion from deionized water which comprises:

(a) passing said deionized water through an ultrafiltration filter having a nominal molecular weight cutoff of at least about 5000 to produce a first effluent, (b) exposing said first effluent to ultraviolet light to oxidize organic species in said first effluent and to produce a second effluent, (c) passing said second effluent through at least one bed of a mixture of anion exchange resin particles and cation exchange resin particles to remove ionic species from said second effluent and to form a third effluent, (d) recycling said third effluent to expose said third effluent to said ultraviolet light and to contact said third effluent with said at least one bed of a mixture of anion exchange particles and cation exchange particles for a time period sufficient to reduce the total concentration of said ions to less than about 10 parts per trillion in a fourth effluent, and (e) recovering a portion of said fourth effluent, wherein the volume ratio of said third effluent to said portion of said fourth effluent is greater than 10, wherein said steps (a), (b), (c), (d), and (e) are conducted in the absence of means for storing said ultrapure water.

2. The process of claim 1 which includes a step of removing heat from said third effluent being recycled to said exposure to ultraviolet light and to said contact with said at least one bed of a mixture of anion exchange particles and cation exchange particles bed.

3. The process of claim 1 wherein at least one bed of a mixture of anion exchange resin and cation exchange resin also includes particles of activated carbon.

4. The process of claim 2 wherein at least one bed of a mixture of anion exchange resin and cation exchange resin also includes particles of activated carbon.

5. The process of any one of claims 1, 2, 3 or 4 wherein said recycling time period is sufficient to reduce the concentration of said ions between 1 and 5 parts per trillion.

6. The process of any one of claims 1, 2, 3 or 4 which includes a step of passing said third effluent through a filter which retains solid particles and which effects separation of gas from liquid.

7. The process of claim 5 which includes a step of passing said third effluent through a filter which retains solid particles and which effects separation of gas from liquid.

8. The process of any one of claims 1, 2, 3 or 4 wherein the volume ratio of said third effluent to said portion of said fourth effluent is greater than about 20.

9. The process of claim 8 which includes a step of passing said third effluent through a filter which retains solid particles and which effects separation of gas from liquid.

10. The process of claim 5 wherein the volume ratio of said third effluent to said portion of said fourth effluent is greater than about 20.

11. The process of claim 6 wherein the volume ratio of said third effluent to said portion of said fourth effluent is greater than about 20.

12. The process of claim 7 wherein the volume ratio of said third effluent to said portion of said fourth effluent is greater than about 20.

* * * * *